(12) United States Patent
Ahmadi

(10) Patent No.: US 8,371,067 B1
(45) Date of Patent: Feb. 12, 2013

(54) DURABLE LIGHTWEIGHT PLANTER WITH ILLUMINATED DISPLAY UNIT

(76) Inventor: William Ahmadi, Los Angeles, CA (US)

( * ) Notice: Subject to any disclaimer, the term of this patent is extended or adjusted under 35 U.S.C. 154(b) by 0 days.

(21) Appl. No.: 13/385,720

(22) Filed: Feb. 29, 2012

Related U.S. Application Data

(63) Continuation of application No. 12/319,253, filed on Jan. 6, 2009, now abandoned.

(51) Int. Cl.
*A01G 9/02* (2006.01)

(52) U.S. Cl. .......... 47/66.6; 47/65.5; 47/65.7; 40/606.03

(58) Field of Classification Search ............ 47/65, 65.5, 47/65.7, 66.1, 66.6; 40/606.03, 606.05, 546, 40/612; 362/154, 812
See application file for complete search history.

(56) References Cited

U.S. PATENT DOCUMENTS

| | | | | | |
|---|---|---|---|---|---|
| 3,803,738 | A | * | 4/1974 | Weiss | 40/306 |
| 5,953,858 | A | * | 9/1999 | Loosen | 47/66.1 |
| 8,166,701 | B1 | * | 5/2012 | Duff, Sr. | 47/39 |
| 2004/0004827 | A1 | * | 1/2004 | Guest | 362/31 |
| 2008/0302002 | A1 | * | 12/2008 | Schmidt | 47/48.5 |

FOREIGN PATENT DOCUMENTS

| | | | | |
|---|---|---|---|---|
| GB | 2431329 | A | * | 4/2007 |
| JP | 05064855 | A | * | 3/1993 |
| JP | 08242711 | A | * | 9/1996 |
| JP | 11318218 | A | * | 11/1999 |
| JP | 2001069858 | A | * | 3/2001 |
| JP | 2008301796 | A | * | 12/2008 |

* cited by examiner

*Primary Examiner* — David Parsley
*Assistant Examiner* — Danielle Clerkley

(57) ABSTRACT

An improved plant container comprised of a cement or stucco exterior coating over wire mesh enclosed polystyrene block segments formed from smaller cube segments. This provides for a planter lighter in weight with effective drainage and moisture retention. The planter allows for effective illuminated signage displays for various advertising.

17 Claims, 6 Drawing Sheets

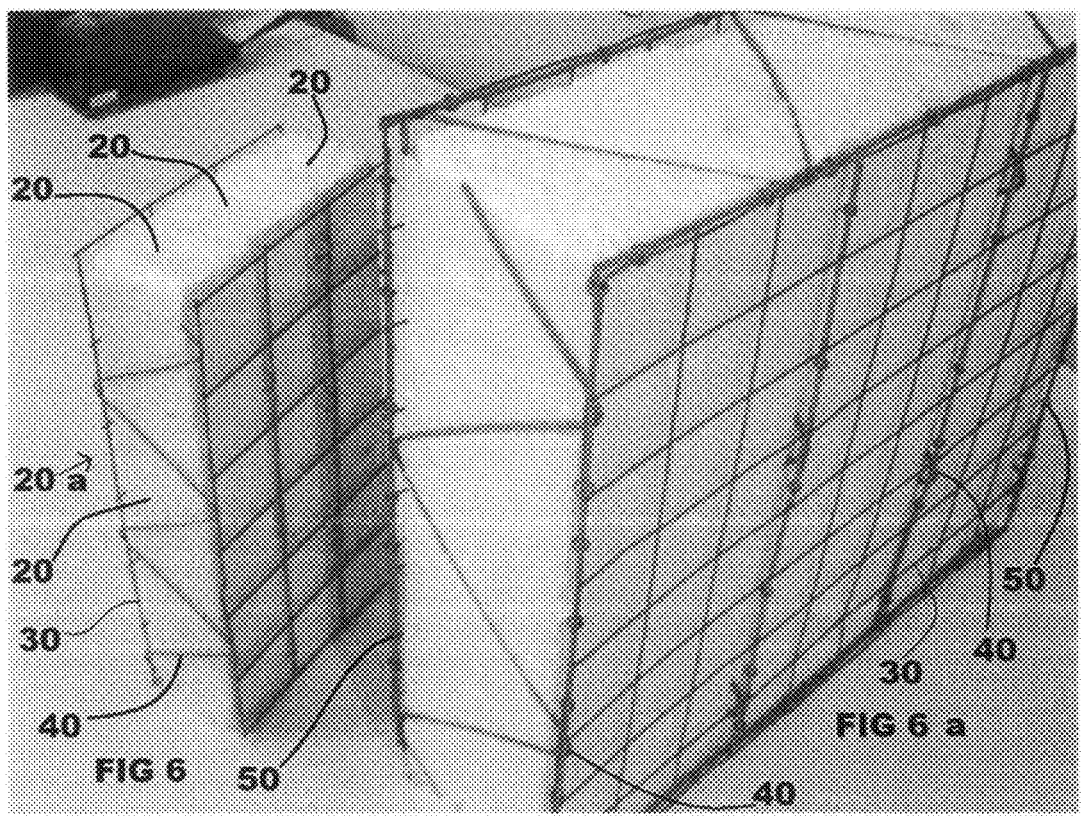

DURABLE LIGHTWEIGHT PLANTER WITH ILLUMINATED DISPLAY UNIT

This is a continuation of application Ser. No. 12/319,253, Filed Jan. 6, 2009, now abandoned

DESCRIPTION

1. Field of the Invention

The invention relates to planters lighter in weight and superior in drainage and soil maintenance with illuminated advertising.

2. Background Information

Large plant containers often seen along medians along a boulevard, typically made from cement or similar heavy materials resulting in planters that are heavy in weight and often times drain improperly leading to over watering.

The U.S patent A01G 9/02 discloses a planter consisting of an outer wooden layer and an inner thin cement layer that retains nutrients and moisture within the cement walls. There is however the disadvantage that such planters are too heavy for practical use consisting of both wood and cement, and the possible decay of the outer wooden portion. To the extent the known containers consist of heavy solid materials such as cement, clays, woods and plastics, the outdoors versions of said planters are heavy and impractical to transport. This planting pot has the advantage that it is made of enmeshed polystyrene covered in a light coat of cement, creating a pot up to 60% lighter than other planters of similar size, allowing ease of transport.

Nakano JP 05064855 and Schurmann GB 2431329 disclose a planter using polystyrene blocks though Nakano does not disclose the use of a wire mesh Schurmann teaches of a resin and plaster finish applied to polystyrene structures and an adhesive to join the polystyrene structures together. However this limits the amount of weight in which the planter may bear as stated by Schurmann, his design is not meant to withstand high pressure from weight.

It is an object of the current invention to present a planter of various sizes from small to large, where in the large embodiments weight is a concern. The current inventions structure enclosing blocks within a metallic mesh with truss wire running between each cube block held by C clamps is then immersed in a cement or stucco mixture instead of plaster and resin and allows the planter to bear much greater weights while not significantly increasing the planters relative weight. Schurmann also teaches of a plastic mesh, however for those skilled in the art the plastic mesh will degrade over time usually becoming brittle in the process.

SUMMARY OF THE INVENTION

An object of the invention is to produce an improved plant container comprised of a cement or stucco exterior coating over polystyrene blocks enclosed in a wire mesh which is light in weight and easy to transport, and in addition provides effective conditions for the proper drainage, moisture retention, and necessary air circulation for healthy plants or trees.

The current invention may consist of a plurality of sizes. Four primary sizes shall be considered as the primary embodiments of the present Invention consisting of:

extra large-4'×4', large-3'×3', medium-2'×2' and small 20 inch diameter. The large size shall be considered the main embodiment of the current invention. However this does not limit the present invention to the current sizes mentioned above. Each polystyrene block individually consists of three individual rectangular cubes of polystyrene placed side by side and inserted within a wire metal caging of intersecting metallic wires both running lengthwise along the enclosed cubes and intersected by wires running perpendicular to the enclosed tubes, the sides of the cage are are bounded by truss wire thus creating a fully enclosed cage where the three cubes are now one enclosed polystyrene block. Each individual cube has a length of 3' by 4½" for the large main embodiment, a 2' length by 2½" width for a medium sized planter and 18" length by 2" width for a small sized planter respectively. Separate truss wire separates each individual cube within the mesh cage and bounds each end of a metal cage and are welded together at all points of contact between two adjoining blocks thus guaranteeing full structural integrity. This is an improvement over prior inventions where warping and cracking of the cement exterior occurred due to movement of the blocks contained within during the curing process of the cement or stucco.

The above objects have been achieved according to the invention in a plant pot container comprising a base and sidewall interior and exterior of light yet sturdy cement or a stucco material with an interior of light weight expanded polystyrene foam material encaged along all six sides of the individual polystyrene block which is then bounded on either end by truss wire mesh. The next polystyrene block is then connected to said truss wire via a C clamping device until an entire structure is derived thereon. A plurality of truss wire gauges may be used, however the preferred embodiment for the present invention is 10 gauge with the truss wire gauge spaced at 15 cm per wire. Once the polystyrene blocks are held in place inside the wire cage and the planter structure is formed by interconnected blocks, then cement, preferably Portland cement or stucco may be applied by hand, sprayed or applied via injection mold to completely cover the interconnected blocks with the exception of at least one drainage hole at the base of the planter for the draining of liquids. For easy transport of the larger planter the base consists of two separate rectangular openings at the base of the planter for forklift blades to lift and place large planters along boulevard medians. Another object of the present invention is to combine the botanic aesthetics with decorative signage and lighting. This object may be accomplished by an impression mold of a plurality of shapes whereby a display plate with indicia is attached to the planter. Such indicia may consists of a city name, street name or address or whatever is desired. This display plate is illuminated from each directional side by a plurality of light emitting diodes directly wired to a solar PV panel attached to the planter to power the light emitting diodes. The solar panel module contains a battery and charge controller for night time lighting. Thus illumination of the planters signage and directional lighting assistance along the street are also provided.

The unique advantage of the invention is that the container is much lighter in weight than most large plant containers, offers easy transport and assists in retaining the proper moisture content of the soil within.

Thus the plant can be planted in the container either as seedlings or as a mature plant in the soil once the plant has been cultivated.

The polystyrene inner portion of the planter thus guarantees the integrity of the planter as a whole, and that the proper level of moisture will remain to cultivate a healthy root system, insuring proper heat distribution while being permeable to air circulation within the soil. Drainage is sufficient enough to prevent root rot and various outgrowths of mold and mildew.

However in regions of very little precipitation and high year round temperatures, the inner polystyrene layer helps retain moisture within the planter.

DRAWINGS

Brief Description of the Drawings

The following description should explain the invented plant container in detail on the basis of drawings.

FIG. 4a is a partial cutaway section of the medium embodiment.

FIG. 6 is a photo of a polystyrene block for a small planter FIG. 6a is a photo of a polystyrene block for a large planter

DETAILED DESCRIPTION OF THE DRAWINGS

Figure 1:
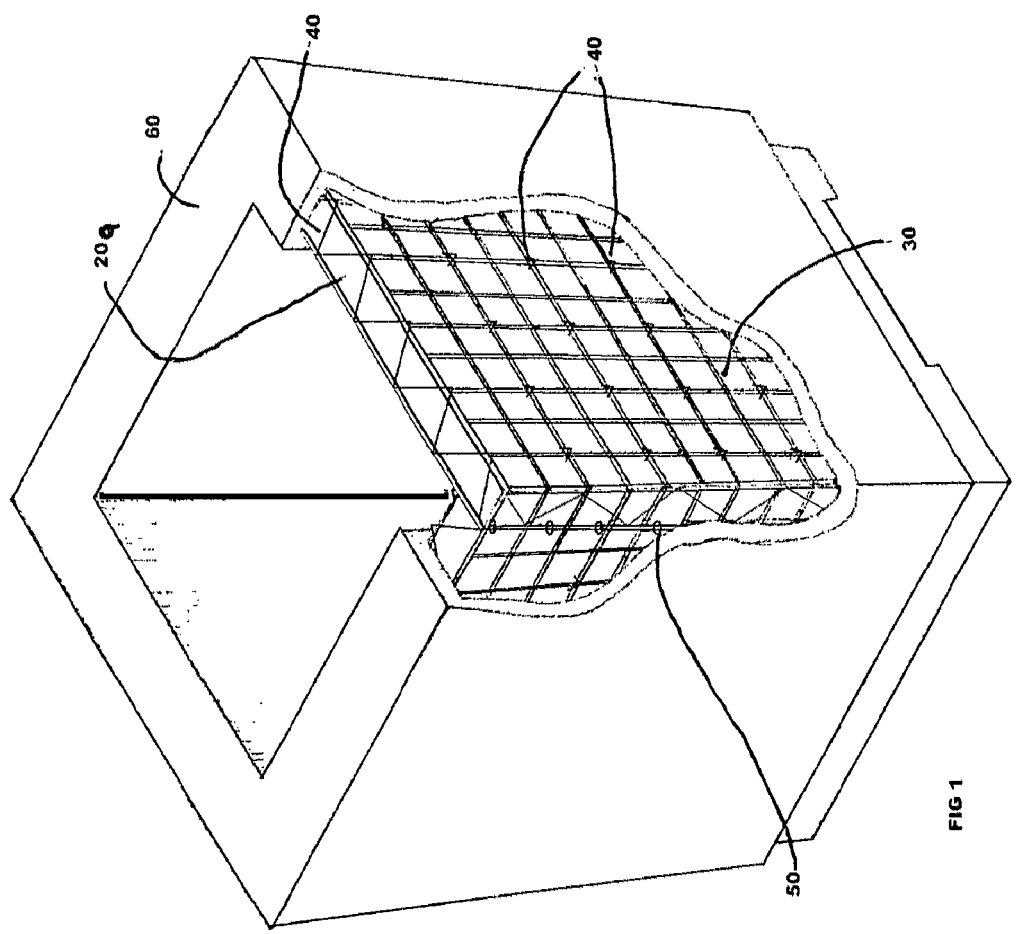
FIG. 1 is a three dimension partial tear away revealing planters interior and exterior

FIG. 1 is a three dimensional view of the planter exposing the interior polystyrene block 20a which further is fastened together by a wire mesh 30 of intersecting vertical and horizontal wire mesh 30 with each horizontal segment of polystyrene cube 20 bisected by a layer of truss wire 40. The side face of the entire length of polystyrene block 20a along both the planters rim base and corners is also bounded by a truss wire 40. Along regular intervals along the wire mesh 30 are fastening C-clamps which solidly enclose the polystyrene blocks 20a enclosed within the wire mesh 30. A cement coating 60 is applied along the entire block segment up to about a minimum thickness of ½ of an inch.

Figure 2:
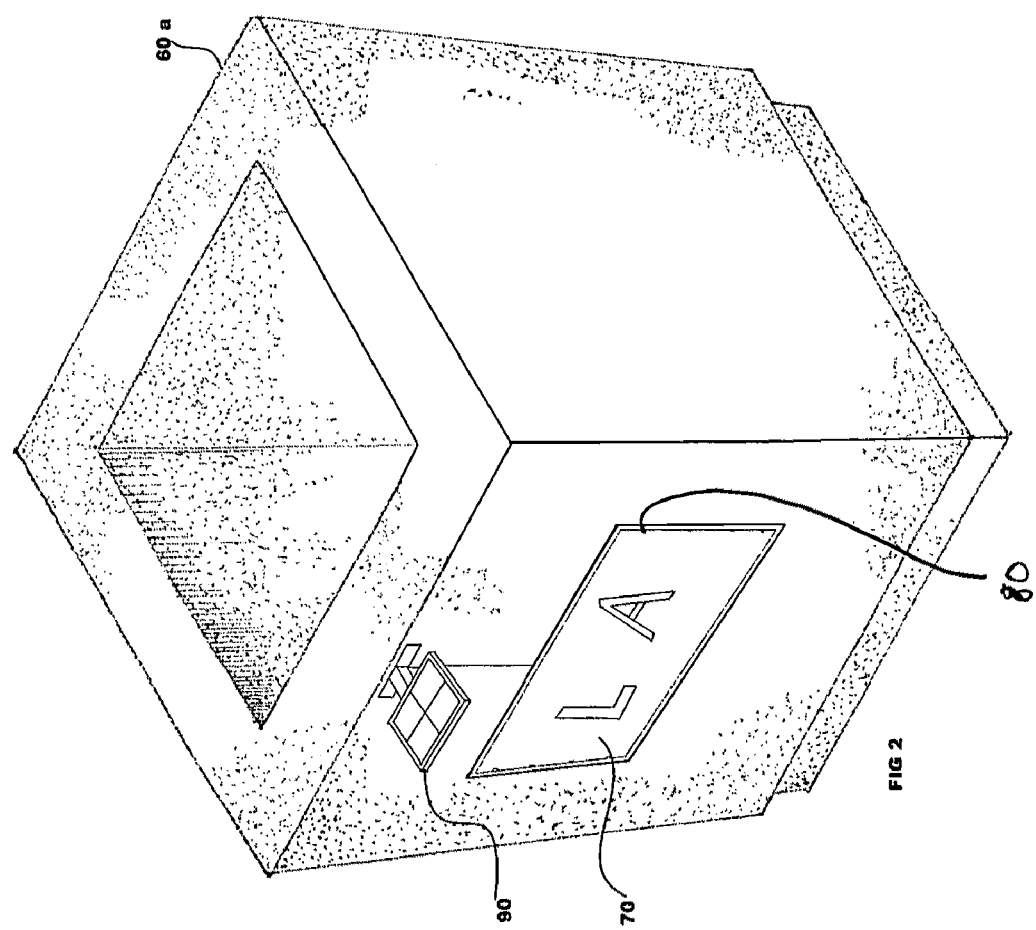
FIG. 2 is a three dimensional stucco planter with illuminated sign and solar panel

FIG. 2 shows a completely stucco 60a covered planter with a decorative light emitting diode 80 illuminated display sign 70. A photovoltaic solar cell 90 is mounted to the planters exterior with a strong adhesive.

Figure 3:
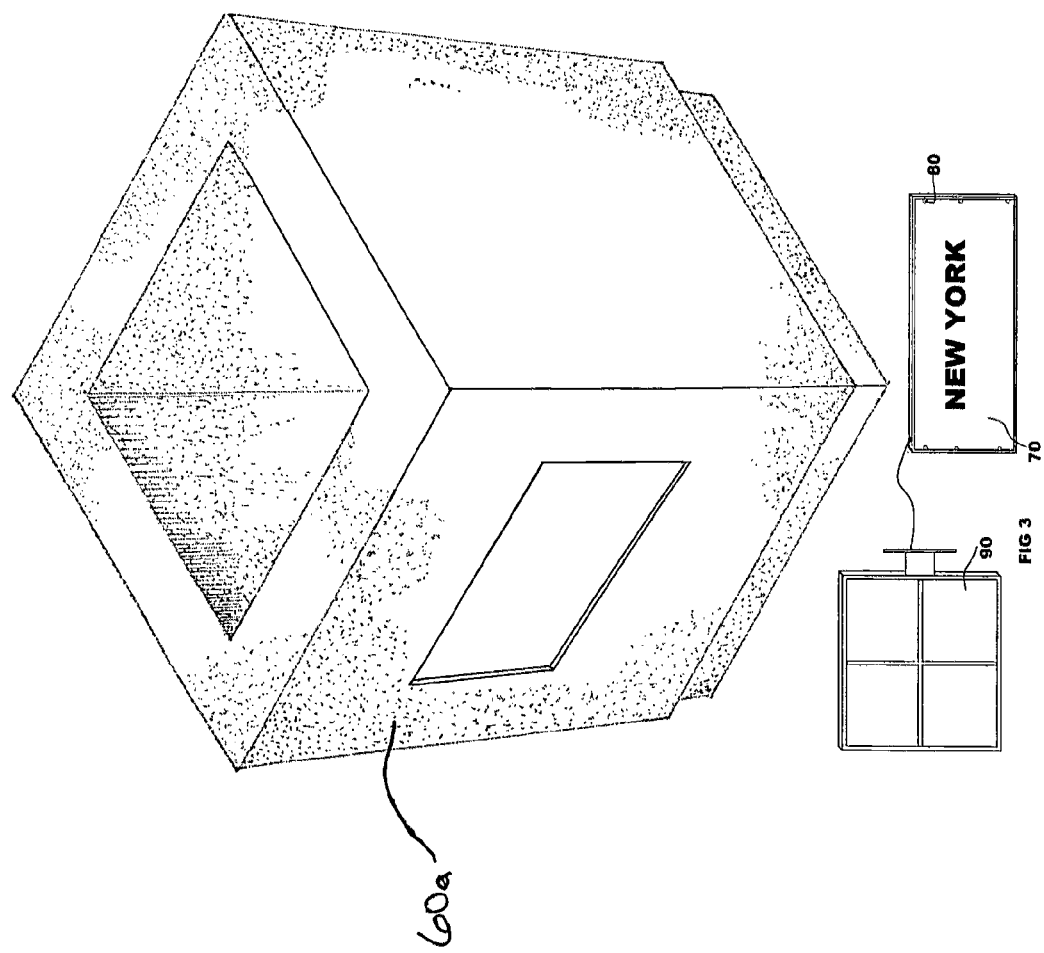
FIG. 3 is a three dimensional cement planter with detached illuminated sign

FIG. 3 illustrates a completely stucco 60a covered planter with a decorative detachable light emitting diode 80 display sign 70. The photovoltaic solar cell 90 is also illustrated here detached from the planter. It should be noted that the power required to power such a tiny number of light emitting diodes 80 is very small thus the photovoltaic cell 90 houses the battery and charge controller internally.

Figure 4:
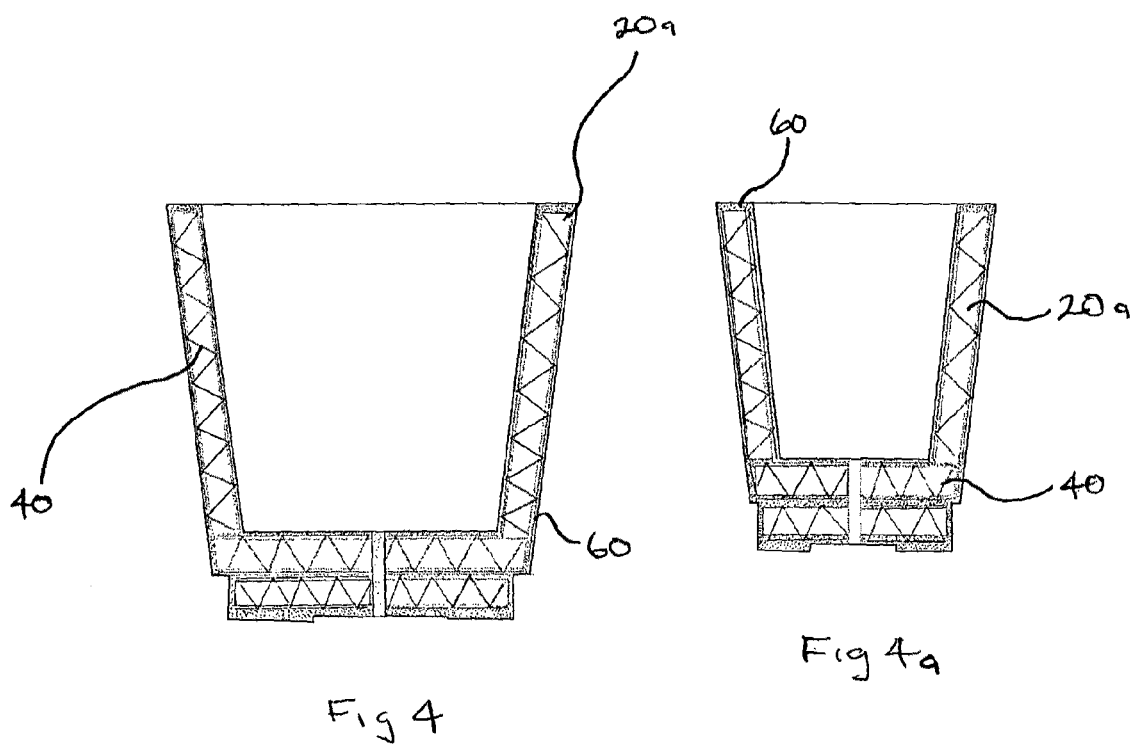
FIG. 4 is a partial cutaway section of the large primary embodiment.

FIG. 4 illustrates a partial cutaway section of a large planter. The section is cut between polystyrene blocks 20a exposing the truss wire 40 that bounds the ends of each polystyrene block 20a segments and polystyrene cubes 20 therein respectively, and are bounded on either side by cement 60. This effectively illustrates the fact that truss wire 40 bounds the polystyrene blocks 20a both horizontally and vertically.

FIG. 4a is an identical illustration as FIG. 4, with the difference being its size to illustrate the current inventions diversity of sizes.

Figure 5:
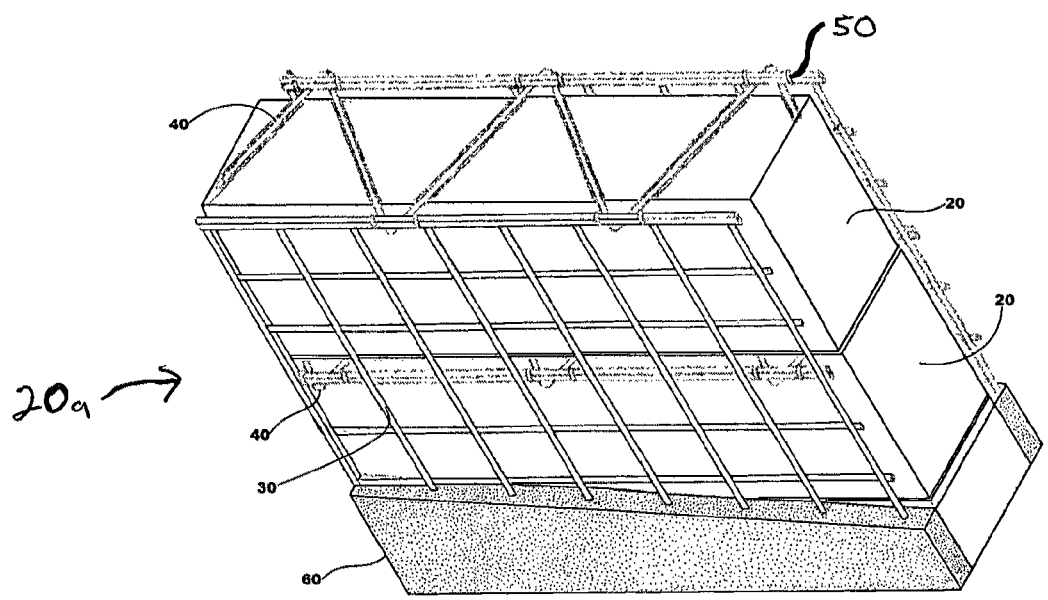
FIG. 5 is a three dimensional view of a polystyrene block composed of two polystyrene cubes

FIG. 5 illustrates a partially cemented 60 wire mesh 30 enclosed polystyrene block 20a consisting of two separate polystyrene cubes 20 bisected by truss wire 40 which itself is fastened to the wire mesh 30 by means of C-clamps 50 and welds at the point(s) of contact. Note that this particular drawing omits the horizontal truss wire 40 that would normally lie across the top of the block. This is done for the purpose of making it easier for the polystyrene cubes 20 to easily be viewed.

FIG. 6 demonstrates a wire mesh 30 enclosed polystyrene block 20a consisting of three polystyrene cubes 20 for a small sized planter. each polystyrene cube 20 stands together vertically and are clearly bisected by truss wire 40 which also bounds the side edge of the polystyrene block 20 where its points of contact with the metallic wire mesh 30 are welded and C-clamped 50 together forming a solid single block that is structurally assured to remain in place.

FIG. 6a demonstrates the same polystyrene block 20 shown in FIG. 6 but for a large planter instead. Along the wire mesh 30 caging are a series of C-clamps 50. Note also that the three polystyrene cubes 20 are larger here than in FIG. 6 and are bisected by truss wire 40 which also bounds the top and side of the polystyrene block 20 as opposed to FIG. 6

CONCLUSIONS, RAMIFICATIONS AND SCOPE

Although the description above contains many specifications, it should be clear to anyone skilled in the art that these should not be construed as limiting the scope of the invention but as merely providing illustrations and definitions of the presently preferred embodiments of this invention. Thus the scope of the invention should be determined by the appended claims and their legal equivalents, rather than by the examples given.

The invention claimed is:

1. A lightweight durable planter consisting of:
   a base directly connected to a plurality of upright sidewalls, each of said base and said sidewalls comprising: a block segment composed of a non-decaying lightweight expanded polystyrene foam, each said foam block segment being encaged about a front surface and a back surface with a wire mesh cage;
   said base and said sidewalls completely covered, on all sides, with an exterior finish;
   said exterior finish comprising a material selected from cement and stucco;
   at least one mold impression on an exterior surface of at least one of said sidewalls;
   a detachable display plate placed within said mold impression for displaying signage;
   at least one light emitting diode attached to said display plate for providing illumination; and
   a solar photovoltaic panel attached to said exterior surface of said at least one of said sidewalls and directly wired to said display plate and said at least one light emitting diode for providing power; wherein said base and said sidewalls form a planter having an interior cavity for receiving plants and trees.

2. A lightweight durable planter according to claim 1, wherein said foam block segment comprises at least two polystyrene rectangular cubes.

3. A lightweight durable planter according to claim 2, wherein each said polystyrene rectangular cube has a dimension of 3' long×4½" wide.

4. A lightweight durable planter according to claim 2, wherein each said polystyrene rectangular cube has a dimension of 2' long×2½" wide.

5. A lightweight durable planter according to claim 2, wherein each said polystyrene rectangular cube has a dimension of 18" long×2" wide.

6. A lightweight durable planter according to claim 1, wherein said wire mesh cage is metallic.

7. A lightweight durable planter according to claim 1, wherein said wire mesh cage is comprises intersecting vertical and horizontal wire about said front and back surface of each said foam block segment.

8. A lightweight durable planter according to claim 1, wherein said foam block segment comprises at least two polystyrene rectangular cubes and a plurality of wire mesh cages are fastened together to house an equal number of said at least two polystyrene rectangular cubes.

9. A lightweight durable planter according to claim 1, wherein said wire mesh cages about said front and back surfaces of said foam block segment are bound together by truss wire aligned along a plurality of side surfaces of said foam block segment.

10. A lightweight durable planter according to claim 9, wherein said truss wire has a gauge of 10.

11. A lightweight durable planter according to claim 9, wherein said truss wire is fastened to the wire mesh caging at all points of contact by a weld.

12. A lightweight durable planter according to claim 1, wherein said planter consists of said base and four upright sidewalls tied together by C-clamps.

13. A lightweight durable planter according to claim 1, wherein said exterior finish having a minimum thickness of ½".

14. A lightweight durable planter according to claim 12, wherein said exterior finish having a minimum thickness of ½".

15. A lightweight durable planter according to claim 1, wherein said at least one light emitting diode comprising a plurality of light emitting diodes.

16. A lightweight durable planter according to claim 1, wherein said photovoltaic panel is attached to said exterior surface of the planter by an adhesive.

17. A lightweight durable planter according to claim 1, where said planter has at least one drainage hole within said base of said planter.

* * * * *